Jan. 5, 1954     A. H. SCHMAL     2,664,766
WEDGE AND SHUTTLE TYPE POWER DIVIDER

Filed Oct. 6, 1951     2 Sheets-Sheet 1

INVENTOR.
ALOIS H. SCHMAL
BY

HIS ATTORNEYS.

Jan. 5, 1954    A. H. SCHMAL    2,664,766
WEDGE AND SHUTTLE TYPE POWER DIVIDER
Filed Oct. 6, 1951    2 Sheets-Sheet 2

INVENTOR.
ALOIS H. SCHMAL
BY
HIS ATTORNEYS.

Patented Jan. 5, 1954

2,664,766

UNITED STATES PATENT OFFICE 2,664,766

WEDGE AND SHUTTLE TYPE POWER DIVIDER

Alois H. Schmal, Westfield, N. J., assignor to Mack Manufacturing Corporation, New York, N. Y., a corporation of Delaware Application October 6, 1951, Serial No. 250,158

10 Claims. (Cl. 74—650)

This invention relates to power dividing mechanisms and it relates more particularly to an improved form of power dividing mechanism for apportioning power more smoothly between a plurality of driven elements.

Power dividing mechanisms of the type to which the invention relates generally are commonly used in vehicles which have multiple driven axles, for example a vehicle having dual rear axles, for example a vehicle having dual rear axles or vehicles having driven front and rear wheels. The purpose of the power divider is to supply power to all of the axles so that if one of the axles should be relieved of its load, for example by the wheels spinning in the mud or snow, power nevertheless can be supplied to other wheels of the vehicle to enable it to free itself. A power divider may also be used instead of a gear differential in a single power driven axle or between wheels to apportion power and provide a differential action.

The present invention provides a power dividing mechanism which operates in an essentially stepless or smooth manner and without appreciable back-lash or play to apportion the power between two or more driven elements by means of a novel arrangement of cams and radially movable wedging elements which cooperate with each other through the medium of shuttle members movable generally parallel to the axis of rotation of the cams. The apportioning of the power is accomplished by means of cams having different numbers of hills or lobes and valleys on the cam surfaces so that the cams tend to operate in out of step relation in order to accomplish the desired division of power between the two driven elements. The cams preferably are provided with smooth merging hills and valleys so that a smooth and stepless division of a power is accomplished, through the movement of the wedges and shuttles associated with these cams.

For a better understanding of the present invention, reference may be had to the accompanying drawings in which.

Figure 1:
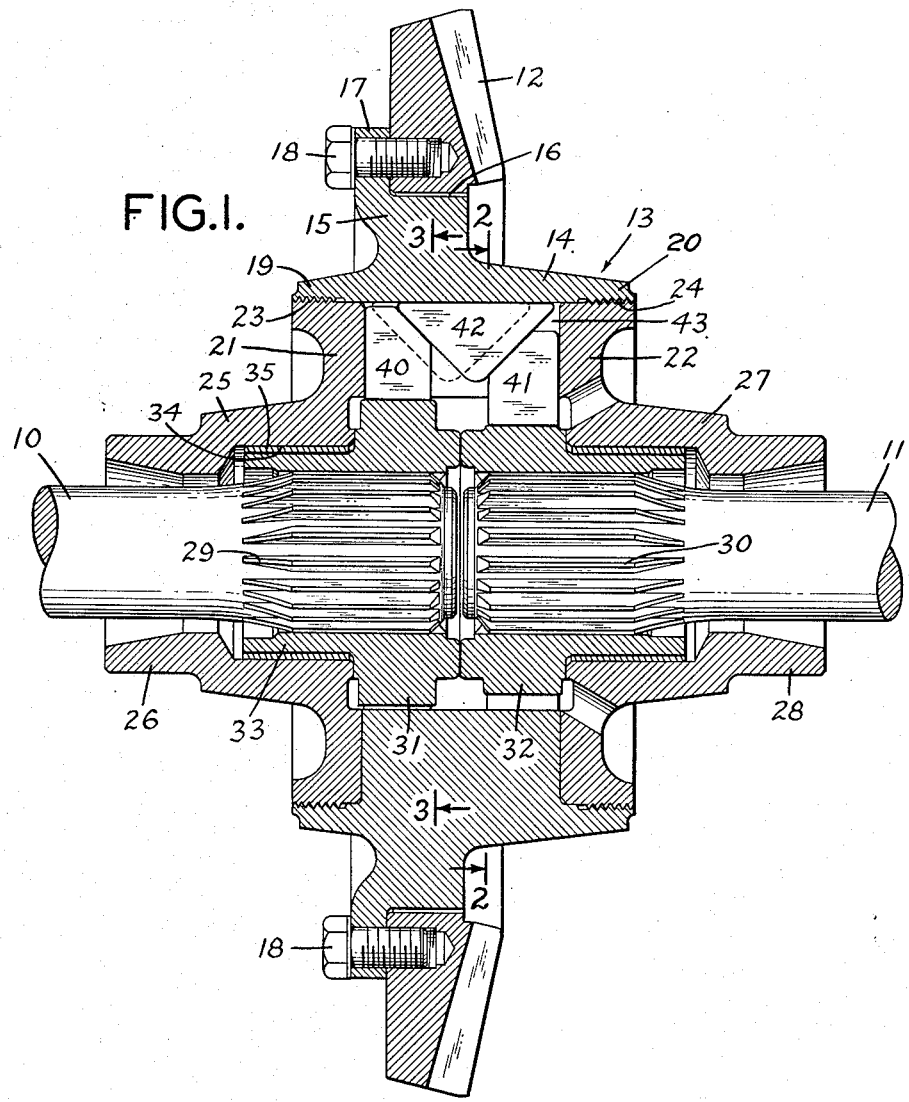
Fig. 1 is a view in section through a typical power divider embodying the present invention.

The power divider chosen for purposes of illustration may be utilized to apportion input power between the output shafts 10 and 11 which may be suitably connected to different axles of a vehicle or other devices to be driven thereby. The power for driving the shafts 10 and 11 may be supplied to the power divider through the medium of a ring gear 12 which, as illustrated, may be of the bevel type. Any other type of gear, sprocket or the like may be used as required.

The gear 12 is mounted around the periphery of the housing 13 of the power divider and is used to rotate the housing 13 bodily about an axis passing through the axes of the aligned shafts 10 and 11. The housing 13 includes an annular ring member 14 provided with a radially extending flange 15 having a shoulder 16 thereon engaging the inner periphery of the ring gear 12 and also having a flange extension 17 engaging the back of the ring gear. The flange extension 17 and the ring gear 12 may be secured to each other by means of cap screws 18 spaced around the flange extension 17. The ring-like body portion 14 of the housing has concentric annular flanges 19 and 20 at its opposite ends to receive the end closure plates 21 and 22. The end closure plates are generally circular members which are connected to the flanges 19 and 20 by means of the cooperating threads 23 and 24 thereon. The end closure plate 21 has an outwardly extending hub 25 thereon through which the driven shaft 10 extends. The hub 25 is provided with a reduced cylindrical portion 26 which is received in a bearing, not shown, to support the housing 13 for rotation with the gear 12. The end plate 22 also has a centrally located hub 27 and a bearing receiving portion 28 thereon.

Figure 3:
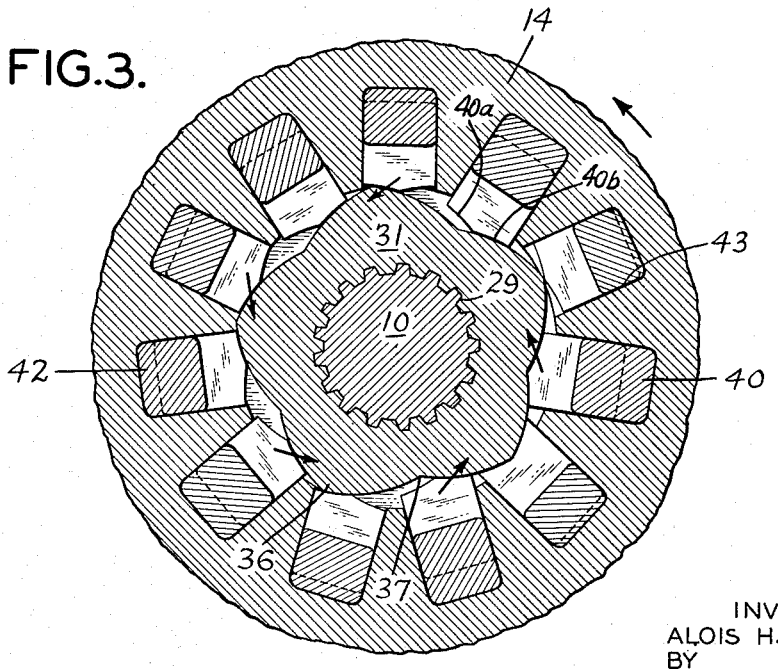
Fig. 3 is a view in section taken on line 3—3 of Fig. 1.

The inner ends of the driven shafts 10 and 11 are provided with the splines 29 and 30 on which are mounted the cam members 31 and 32. The cam member 31 has a sleeve portion 33 receiving the splines 29 at its inner periphery and extends into a cylindrical recess 34 in the hub 25 where it is received for rotation in a bushing or bearing 35. As best shown in Fig. 3, the cam 31 is provided, in the illustrative example, with five lobes or hills 36 and an equal number of interposed valleys 37. The hills 36 merge smoothly into the valleys thereby forming an undulant cam surface. The cams are essentially involute in shape.

Figure 2:
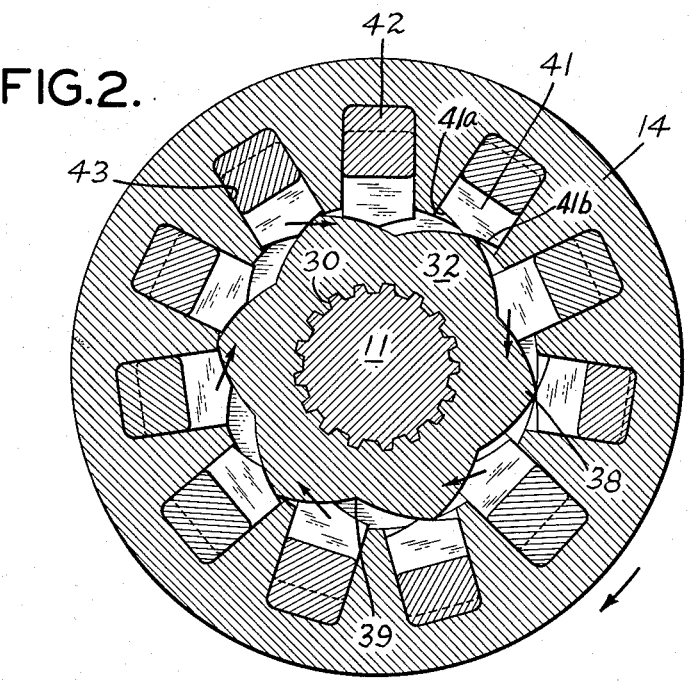
Fig. 2 is a view in section taken on line 2—2 of Fig. 1.

The cam 32, as shown in Figs. 1 and 2, is mounted on the shaft 11 and in the hub 27 in the same way as the cam 31. The cam 32 has, however, one more hill or lobe 38 and one more valley 39 than the cam 31. The actual number of hills and valleys in the cams 31 and 32 is relatively unimportant so long as one of the cams has one more hill or lobe and one more valley than the other.

The cams 31 and 32 cooperate with sets of wedge elements 40 and 41, respectively, and interposed shuttle members 42 to accomplish the desired division of power. As best shown in Figs. 2 and 3, the wedge elements 40 and 41 are mounted in the opposite ends of radially extending slots or grooves 43 in the inner periphery of the casing ring 14. The number of grooves in the casing ring 14 is equal to the sum of the number of the lobes on the two cams, in the example given, eleven grooves or a multiple thereof by a whole number. Likewise, the number of shuttles 42 which are also received in the outer ends of the grooves or slots 43 is equal to the sum of the number of lobes on both cams or a multiple by a whole number thereof. As illustrated, the number of shuttles 42 mounted in the grooves is eleven, there being one shuttle in each groove, each shuttle cooperating with one wedge member 40 and 41 at each end. The shuttle members 42 are of generally triangular shape having inwardly converging side edges and a base edge bearing against the bottom or outer end of a slot 43. The inside corners of the wedges 40 and 41 are mitered or bevelled complementally to the inclination of the corresponding converging edges of the shuttles 42. The inner ends of the wedges may be formed with angularly related concave faces 40a, 40b or 41a, 41b substantially conforming to the shape of the outer surfaces of the lobes or hills on the cam members.

The above-described arrangement of the shuttles and wedges enables inward and outward movement of the wedges over the cam surfaces and movement of the shuttles generally parallel to the axis of rotation of the housing 13 upon relative rotation of the housing 13 and the cams 31 and 32. Thus, when the gear 12 is being driven and the shaft 10 for example is unloaded, the shaft 10 would tend to spin freely if it were not for the control exerted by the wedges and shuttles. The shuttles and wedges can only move when both of the shafts rotate so that the shaft 11 is supplied with a portion of the power supplied to the unit, even though the shaft 10 is completely unloaded. In this way, either of the shafts 10 and 11 may be relieved of its load while permitting the transmission of power supplied to the unit to the other load bearing output or driven shaft of the unit. Inasmuch as the hills and valleys of the cams are curved smoothly, the wedges will move gradually inwardly and outwardly without steps or intermittent action and, as a consequence, a smooth division of power and a smooth differential action is obtained through the use of the new unit. The relations between the cams, wedges and shutters are most advantageous, in that, regardless of the relative positions of the cams, a plurality of the sets of wedges and shuttles are always in a position to transmit power in either direction. Therefore, reversal of rotation of the shafts or the power divider as a whole can take place without back-lash or play.

The new power divider is rugged and easy to service. Moreover, the manufacture and assembly of the unit is greatly facilitated by its simple design.

It will be understood that the power dividing mechanism described herein is susceptible to substantial modification in the structure of the housing of the unit, the number of lobes or hills on the cams and the number of wedges and shuttles cooperating with the cams. Therefore, the form of the invention described herein should be considered as illustrative and not as limiting the scope of the following claims.

I claim:

1. A power divider comprising a housing to be rotated by a source of power, a pair of cam members rotatably mounted in said housing coaxial with the axis of rotation of said housing, output shafts connected to said cams and rotatable therewith, said cam members having radially extending lobes and interposed valleys on their peripheries, one of said cam members having one more lobe than the other, wedge elements engaging the peripheries of said cam members and radially movable relative to said housing, and shuttle elements engaging the outer ends of said wedge elements and movable in said housing parallel with its axis.

2. The power divider set forth in claim 1, comprising a plurality of shuttles equal in number to, or a multiple by a whole number of, the sum of the lobes of both cams, and a cam-engaging wedge at each end of each shuttle.

3. The power divider set forth in claim 1 in which said shuttles have outer edges substantially parallel with the axis of said housing and inwardly converging edges, and said wedges have complementally inclined edges engaging the converging edges on said shuttles.

4. A power divider comprising a housing to be rotated by a source of power, a pair of cam members rotatably mounted in said housing coaxial with the axis of rotation of said housing, each cam member having an undulant cam surface including alternating hills and valleys, one of said cam members having one more lobe than the other cam member, radially extending guide means in said housing outwardly of said cam members, a plurality of shuttle members mounted in said guide means for movement parallel with the axis of said housing, and wedge elements at opposite ends of each shuttle member in sliding engagement therewith, said shuttle members having ends inclined complementally to said wedges, each wedge member being radially movable in said guide means and having an inner end engaging the cam surface of one of said cams.

5. A power divider comprising a housing to be rotated by a source of power, a pair of cam members rotatably mounted in and coaxial with the axis of rotation of said housing, said cam members being spaced apart axially and each having an undulant cam surface including alternating hills and valleys, the cam surface on one cam member having one more hill than the cam surface on the other cam member, an output member connected to and rotatable with each cam member, two sets of wedge elements guided in said housing for substantially radial movement, one set of wedge elements being movable in response to relative rotation of said housing and one of said cam members, and the other set of wedge elements being movable in response to relative rotation of said housing and the other cam member, and shuttle elements movable in said housing substantially parallel with said axis of rotation, said shuttle elements being interposed between said sets of wedge elements and each shuttle element engaging wedge elements at its opposite ends.

6. A power divider comprising a housing to be rotated by a source of power, a pair of cam members rotatably mounted in said housing coaxial with its axis of rotation, each cam member having an undulant cam surface including alternate hills and valleys, one of the cam surfaces having one more hill than the other, wedge elements cooperating with the cam surfaces and movable substantially radially in said housing in response to relative rotation of said housing and cam members, and shuttle elements engaging with one end of the wedge elements cooperating with one cam surface and engaging with their other ends the wedge elements cooperating with the other cam surface, said shuttle elements being movable in said housing substantially parallel with its axis of rotation.

7. The power divider set forth in claim 6 in which the number of shuttles is equal to, or a multiple by a whole number of, the sum of the hills on both of said cam surfaces.

8. The power divider set forth in claim 6 in which said shuttle elements and said wedge elements have complementally inclined engaging surfaces and said shuttle elements have outer surfaces substantially parallel with said axis of rotation.

9. A power divider comprising a housing to be rotated by a source of power, a pair of cam members rotatably mounted in said housing substantially coaxial with the axis of rotation of said housing, each cam member having an undulant cam surface thereon including alternating hills and valleys, one of the cam surfaces having one more hill and one more valley than the other cam surface, a cage fixed in said housing outwardly of said cam members and having radially extending slots therein opening toward said cam members, a first set of wedge elements mounted in said slots adjacent one end thereof and movable radially in said slots upon relative rotation of said housing and one of the cam surfaces, a second set of wedge elements in said slots adjacent the other end thereof and movable radially thereof upon relative rotation of said housing and the other of said cam surfaces, and shuttle elements having inwardly inclined ends in the outer ends of said slots, each shuttle element being interposed between and having its inclined ends engaging one wedge element of each of said first and second sets of wedge elements and slidable along said slot substantially parallel with said axis of rotation.

10. The power divider set forth in claim 9 in which the number of shuttle elements is equal to, or a multiple by a whole number of, the sum of the number of hills on said cam surfaces.

ALOIS H. SCHMAL.

References Cited in the file of this patent

UNITED STATES PATENTS

| Number | Name | Date |
|---|---|---|
| 1,283,283 | Patch | Oct. 29, 1918 |
| 1,836,684 | Robbins | Dec. 15, 1931 |
| 2,016,849 | Arnold | Oct. 8, 1935 |
| 2,369,075 | Robbins | Feb. 6, 1945 |
| 2,440,975 | Robbins | May 4, 1948 |